3,277,085
1-AMINO OR HALO-3-AMINOMETHYL
ISOQUINOLINES
Albert Aebi and Mohan Damodaran Nair, Bombay, India, and Karl Bucher, Basel, Switzerland, assignors to Ciba of India Limited, Bombay, India, a company of India
No Drawing. Filed Feb. 18, 1964, Ser. No. 345,557
Claims priority, application Switzerland, Feb. 21, 1963, 2,205/63
13 Claims. (Cl. 260—247.2)

The present invention provides as new compounds 4-$R_4$-1-$R_1$-3-$R_3$-isoquinoline compounds in which $R_1$ represents a halogen atom or an amino group, $R_3$ an aminomethyl group, and $R_4$ an aliphatic hydrocarbon radical which may be substituted by aryl or heterocyclyl groups, or a cycloaliphatic hydrocarbon radical.

The new compounds may be substituted in the carbocycle of isoquinoline, more especially by halogen atoms such as fluorine, chlorine or bromine or by the pseudohalogen trifluoromethyl; by alkyl, alkoxy or alkylmercapto groups in which the alkyl radicals contain with advantage 1 to 4 carbon atoms, such as methyl, ethyl, propyl or butyl; by alkylenedioxy groups such as methylenedioxy, or by nitro or amino groups.

The amino groups in position 1 and at the methyl group in position 3 are preferably substituted, more especially disubstituted, and they may be different from one another. Suitable substituents are, for example: lower monovalent aliphatic hydrocarbon radicals which may be interrupted by hetero atoms (such as oxygen or nitrogen) and/or substituted by halogen atoms or free hydroxyl groups or by amino groups (which may be free of substituted as indicated above) and which may be linked once more by a lower alkylene group with the amino groups which may substitute them; bivalent aliphatic hydrocarbon radicals which may be interrupted by hetero atoms such as oxygen or nitrogen; cycloaliphatic or cycloaliphatic-aliphatic hydrocarbon radicals which may be substituted by alkyl groups; or araliphatic or aryl radicals of which the aromatic radicals may be substituted, for example, as indicated above. Specifically, there may be mentioned lower alkyls such as methyl or ethyl; linear or branched propyl, butyl, pentyl or hexyl radicals linked in any desired position; lower alkenyls such as allyl or methallyl; lower hydroxyalkyl groups such as β-hydroxyethyl; lower halogenalkyls such as β-halogenethyl radicals; lower aminoalkyl radicals such as β-aminoethyl or γ-aminopropyl radicals in which the amino group may be substituted as indicated above; lower oxaalkyl radicals such as methoxy- or ethoxy-ethyl or -propyl radicals; lower alklene radicals, above all those whose chain contains 4 to 7 carbon atoms, such as butylene-(1,4), pentylene-(1,5), pentylene-(2,5), hexylene-(1,6), hexylene-(2,6) or hexylene-(2,5), heptylene-(1,7), heptylene-(2,7) or heptylene-(2,6); lower oxaalkylene or azaalkylene radicals containing 4 to 7 carbon atoms, such as 3-oxapentylene-(1,5), 3-azapentylene-(1,5), 4-azahexylene-(2,6), 3-asaheptylene-(1,7), 4-azaheptylene-(2,6) or the corresponding azaalkylene groups which are substituted at the aza-nitrogen by lower alkyls such as methyl or ethyl, or by hydroxyalkyls such as β-hydroxyethyl or γ-hydroxypropyl-radicals; cycloalkyl, cycloalkenyl, cycloalkylalkyl or cycloalkenyl-alkyl radicals such as cyclopentyl, cyclopentenyl, cyclohexyl, cyclohexenyl radicals or by methyl or ethyl groups substituted by such radicals; phenyl-lower alkyl radicals which may be substituted in the aromatic radical, for example as indicated above, more especially by halogen, lower alkyls or lower alkoxy radicals, above all phenylmethyl or 1- or 2-phenylethyl groups or phenylalkenyl groups, or phenyl radicals which may be substituted as indicated above.

The amino groups are above all di-lower alkylamino groups, pyrrolidino, piperidino, piperazino or N-methylpiperazino, N-ethylpiperazino or N-β-hydroxyethyl-piperazino groups, and primarily morpholino groups.

The radical $R_4$ is above all an alkyl or alkenyl group, such as methyl or ethyl or a propyl, butyl or pentyl radical, or a phenyl-lower alkyl group which may be substituted in the aromatic part, for example as indicated above, for instance a benzyl- or 1- or 2-phenyl-ethyl radical, or a pyridyl-lower alkyl or thienyl-lower alkyl group. Preferably, it is methyl.

The new compounds have valuable pharmacological properties, especially antitussive properties. In the pigeon, they can be shown to exhibit an elective inhibition of the elementary expiratory activity, and in the cat to inhibit the cough reflex. Compounds of the kind obtained by the process of this invention can therefore be used as antitussive agents. Moreover, they can serve as intermediate products for the manufacture of medicaments. Thus, the 1-halogen compounds can be used as starting materials for the manufacture of the 1-amino compounds, and the compounds which in the benzene nucleus of the isoquinoline system contain a nitro or amino group can be used in the manufacture of differently substituted compounds, for example, by reduction of the nitro group or exchange of the amino group.

Particularly valuable are compounds of the formula

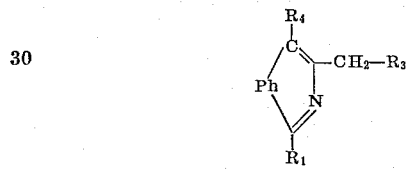

where Ph represents a phenylene-(1,2) radical which may be substituted, e.g. as indicated above, primarily a phenylene-(1,2) or a halogen-phenylene-(1,2) radical especially the 4-halogen-phenylene-(1,2) radical corresponding to the 7-halogen-isoquinoline, $R_4$ represents a lower alkyl group, above all methyl, and $R_1$ and $R_3$ stand for amino groups, more especially tertiary amino groups substituted as indicated above and in the first place di-lower alkylamino groups, pyrrolidino, piperidino, piperazino or N-methylpiperazino, N-ethylpiperazino or N-β-hydroxyethyl-piperazino groups, and above all morpholino groups.

Also valuable as antitussive agents and as intermediate products are the compounds of the formula

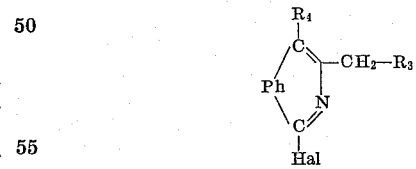

where $R_3$ and $R_4$ have the meanings given above and Hal stands for a halogen atom, and Ph stands for a phenylene-(1,2) radical which may be substituted, e.g. as indicated above, above all the phenylene-(1,2) or a halogen- or nitro-phenylene-(1,2) radical, especially the 3-nitro-phenylene-(1,2) radical which corresponds to the 5-nitro-isoquinoline. Special mention deserves above all the 4-methyl-1-morpholino-3-morpholino-methylisoquinoline, its 7-chloro-derivative and the 4-methyl-1-morpholino-3-(2-methyl-piperidinomethyl)-isoquinoline.

The new compounds are obtained when a 4-$R_4$-isoquinoline which contains a halogen atom in position 1 and a halogenmethyl group in position 3 is reacted with ammonia or an amine carrying a hydrogen atom, and, if desired, a resulting 4-$R_4$-3-aminomethyl-1-halogen-isoquinoline is again reacted with ammonia or an amine containing a hydrogen atom. Depending on the reaction conditions and the quantities of the reactants used, both halogen atoms are exchanged in one operation during the reaction with ammonia or the amine, or only the halogen atom at the methyl group in position 3 is exchanged, after which, if desired, the halogen atom in position 1 can be exchanged by further reaction with ammonia or amine, if desired under more energetic conditions. If ammonia or a primary amine is used, a di-[4-$R_4$-1-$R_1$-isoquinolyl-(3)-methyl]-amine may result depending on the amounts and reaction conditions used. As halogen atoms, chlorine atoms are preferred.

If the resulting compound contains primary or secondary amino groups, substituents can be introduced into it in the conventional manner, for example by treatment with a reactive ester of an alcohol or by the reductive alkylation method with the use of suitable carbonyl compounds, or by acylation with carboxylic acids and reduction of the resulting N-acyl compounds. Furthermore, substituents in the benzene nucleus of the isoquinoline system can be modified in the usual manner, e.g. nitro groups can be reduced or amino groups replaced by other groups, such as halogen.

The present invention includes also any modification of the process in which an intermediate obtained at any stage thereof is used as starting material and any remaining step or steps is/ are carried out, or the process is discontinued at any stage thereof, or in which a starting material is formed under the reaction conditions or is used in the form of one of its salts.

The afore-mentioned reactions are performed in the conventional manner in the presence or absence of diluents, condensing agents and/or catalysts, at room temperature or with cooling or heating, if desired under superatmospheric pressure.

Depending on the reaction conditions and starting materials used the new compounds are obtained in the free form or in the form of their salts. The salts of the new compounds can be transformed in the known manner into the free compounds, for example acid addition salts by reaction with a basic agent. On the other hand, a resulting free base can be converted with inorganic or organic acids into salts. For the manufacture of acid addition salts preferred use is made therapeutically useful acids, for example a hydrohalic acid such as hydrochloric or hydrobromic acid, perchloric, nitric or thiocyanic acid, sulfuric or phosphoric acids; or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methanesulfonic, ethanesulfonic, hydroxyethanesulfonic, benzenesulfonic, paratoluenesulfonic, naphthalenesulfonic or sulfanilic acid; methionine, tryptophan, lysine or arginine. The salts may be monosalts or polysalts.

These or other salts of the new compound, as e.g. the picrates, may also serve for the purification of the resulting bases by converting the bases into salts separating the salts and liberating the bases from the salts. In view of the close relation between free bases and the bases in the form of salts thereof, whenever a free base is referred to in this context, a corresponding salt is also intended, provided such is possible or applicable under the circumstances.

The new compounds are intended to be used as medicaments in the form of pharmaceutical preparations containing the said compounds in conjunction or admixture with organic or inorganic, solid or liquid pharmaceutical excipients suitable for enteral (for example oral) or parenteral administration. Suitable excipients are substances that do not react with the new compounds, for example water, gelatine, lactose, starches, magnesium stearate, talcum, vegetable oils, benzyl alcohols, gums, polyalkylene glycols, cholesterol or other known medicinal excipients. The pharmaceutical preparations may be, for example, tablets, dragees or capsules, or in liquid form solutions, suspensions or emulsions. They may be sterilized and/or may contain assistants such as preserving, stabilizing, wetting or emulsifying agents, salts for regulating the osmotic pressure, of buffers. They may further contain other therapetically valuable substances.

The required doses of the new preparations naturally depend on the kind of disease and the condition of the patient. A single dose is, for example 10–50 mg. p.o. or 5–30 mg. for parenteral administration. The preparations contain, for example 0.05–60% of active constituents.

The starting materials are known or can be prepared by known methods. Thus, for example, 1-halogen-3-halomethyl-isoquinolines that are substituted in position 4 in the manner indicated above may be obtained by treating a suitable 4-substituted 4-methyl-1,3-dioxo-1,2,3,4-tetrahydro-isoquinoline with a phosphorus halide, for example phosphorus pentachloride, phosphorus trichloride or primarily with phosphorus oxychloride, advantageously in the presence of a small amount of water, which leads to halogenation and rearrangement to the 1-halogen-3-halomethyl-isoquinolines.

The 4-substituted 4-methyl-1,3-dioxo-1,2,3,4-tetrahydro-isoquinolines preferably used as starting material are obtained by a conventional 4-substitution of suitable 4-unsubstituted or 4-monosubstituted compounds. Thus, starting from homophthalimide, treatment (for example with sodium hydride as condensing agent and in dimethylsulfoxide as solvent) with a methylhalide yields the 4,4-dimethyl compound. Alternatively, the starting material—an α-substituted α - (ortho - cyanophenyl)-acetonitrile—may be subjected to hydrolytic cyclisation to yield 4-substituted 1,3-dioxo - 1,2,3,4 - tetrahydroisoquinolines which can be alkylated in the manner described above, provided of course that one of the two radicals in position 4 is a methyl radical.

Advantageously, those starting materials and procedures are employed that lead to the end products pointed out above as particularly valuable.

The following examples illustrate the invention.

EXAMPLE 1

A mixture of 9.0 g. of 1-chloro-3-chloromethyl-4-methyl-isoquinoline and 40 ml. pyrrolidine is heated in a bomb-tube at 150° C. for 8 hours. The resulting material is taken to dryness under reduced pressure, the residue treated with water and extracted with methylene chloride. The solvent is removed after drying over sodium sulfate and the oil converted into the hydrochloride by addition of ethanolic hydrochloric acid. The thus-obtained hydrochloride of 4-methyl-1-pyrrolidino-3-pyrrolidinomethyl-isoquinoline of the formula

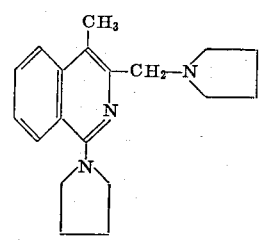

is crystallized from ethanol-ether and then melts at 239° C.

EXAMPLE 2

A mixture of 9.0 g. of 1-chloro-3-chloromethyl-4-methyl-isoquinoline and 40 ml. piperidine is heated in a bomb-tube at 150° C. for 8 hours. The resulting material is taken to dryness under reduced pressure and the residue treated with water and extracted with methylene chloride. The extract is dried and the solvent removed. The resulting oil is redissolved in chloroform and filtered through alumina. The crystalline product obtained is recrystallized from ethanol-water. The thus-obtained 4-methyl-1-piperidino-3-piperidinomethyl-isoquinoline of the formula

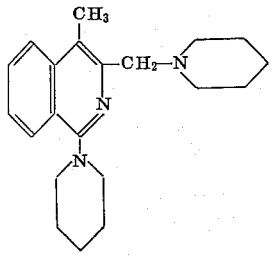

melts at 111° C.

EXAMPLE 3

A mixture of 8.0 g. of 1-chloro-3-chloromethyl-4-methyl-isoquinoline and 50 ml. N-methyl-piperazine is heated at 150° C. for 8 hours. After being reduced to dryness under reduced pressure the residue is treated with water, extracted with methylene chloride, the extract dried and stripped of solvent. The resulting oil is redissolved in chloroform and filtered through alumina. The crystalline product obtained is recrystallized from acetone. The thus-obtained 4-methyl-1-(N'-methyl-piperazino)-3-(N'-methyl-piperazino-methyl)-isoquinoline of the formula

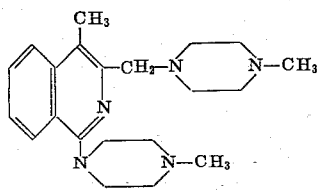

melts at 110–111° C., its hydrochloride at 238° C.

EXAMPLE 4

A mixture of 8.0 g. of 1-chloro-3-chloromethyl-4-methyl-isoquinoline and 40 ml. of N-(β-hydroxy-ethyl)-piperazine is heated in a bomb-tube at 150° C. for 8 hours. The resulting material is taken to dryness, the residue is treated with water and extracted with methylene chloride. The extract is dried, stripped of solvent, the resulting oil redissolved in chloroform and filtered through alumina. The crystalline product obtained is recrystallized from acetone. The thus-obtained 4-methyl-1-[N'-(β-hydroxy -ethyl) - piperazino] - 3 - [N' - (β - hydroxy - ethyl)-piperazino-methyl]-isoquinoline of the formula

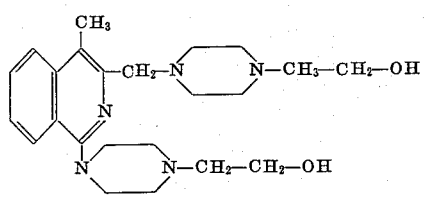

melts at 112° C. Its hydrochloride melts at 263° C. (dec.).

EXAMPLE 5

A mixture of 6.0 g. of 1-chloro-3-chloromethyl-4-methyl-isoquinoline and 15 ml. diethylamine is heated at 150° C. for 8 hours. The resulting mass is evaporated to dryness under reduced pressure. The residue is treated with water. The semi-solid mass which separates is filtered off to give a low melting solid. The thus-obtained 1-diethylamino - 3 - diethylamino methyl - 4 - methyl - isoquinoline of the formula

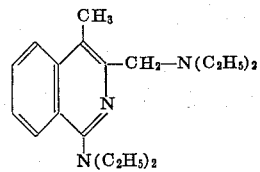

is converted into its dimaleate which after crysallization from methanol-ether melts at 109–111° C.

EXAMPLE 6

A mixture of 4.5 g. of 1-chloro-3-chloromethyl-4-methyl-isoquinoline and 15 ml. of ethanolamine is heated in an oil-bath at 130° C. for 3 hours and the dark syrupy liquid poured into 200 ml. of cracked ice and water. The emulsion is extracted with chloroform, the extract washed with water, dried and stripped of solvent to give an oil. The thus-obtained 1-(β-hydroxy-ethylamino)-3-(β-hydroxy-ethylaminomethyl)-isoquinoline of the formula

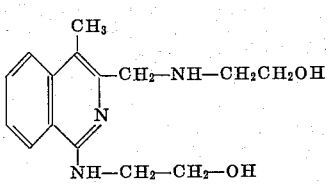

is converted into its hydrochloride which after crystallization from ethanol-ether melts at 252–254° C.

EXAMPLE 7

A mixture of 5.0 g. of 1-chloro-3-chloromethyl-4-methyl-isoquinoline and 20 ml. of N-carbethoxy-piperazine is heated in an oil-bath at 140° C. for six hours at the end of which time the syrupy liquid is poured into 200 g. of cracked ice and water. The slurry is extracted with chloroform, the extract washed, dried and stripped of solvent. The residue on keeping in an ice-box crystallizes. The thus-obtained 1 - (N' - carbethoxy - piperazino) - 3 - (N'-carbethoxy - piperazino - methyl) - 4 - methyl - isoquinoline of the formula

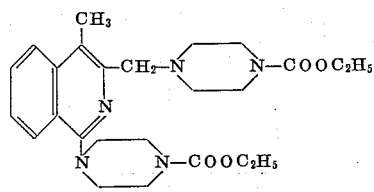

melts after recrystallization from n-hexane at 90–92° C.

EXAMPLE 8

A mixture of 5.0 g. of 1-chloro-3-chloromethyl-4-methyl-isoquinoline and 20 ml. of 2-methyl-piperidine is heated under reflux in an oil-bath at 140° C. for six hours. The excess of base is removed under reduced pressure and the residue treated with cracked ice and water. The solid which separates is filtered, dried and crystallized from ethanol. The thus-obtained 1-chloro-3-(2-methyl-piperidino-methyl)-4-methyl-isoquinoline of the formula

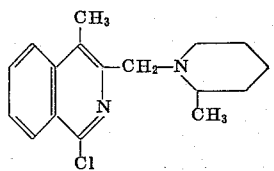

melts at 106–108° C.

EXAMPLE 9

A mixture of 6.0 g. of 1-chloro-3-(2-methyl-piperidinomethyl)-4-methyl-isoquinoline and 20 ml. morpholine is heated in a bomb-tube at 170° C. for 14 hours at the end of which the semisolid gum is taken up in chloroform and the solvent removed under reduced pressure. Addition of 200 g. of cracked ice and water precipitates a solid which is filtered, washed with water, dried and then crystallized from ethanol. Thus-obtained 1-morpholino-3-(2-methyl-piperidino-methyl)-4-methyl-isoquinoline of the formula

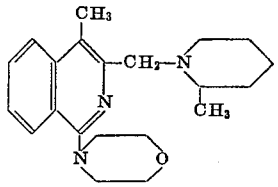

melts at 103–104° C.

EXAMPLE 10

A mixture of 2.0 g. 1-chloro-3-chloromethyl-4-methyl-5 nitro-isoquinoline and 10 ml. of morpholine is heated at 120° C. for 2 hours under reflux. The excess of morpholine is removed under reduced pressure and the residual oil taken up in cracked ice and water. The mixture is extracted with chloroform, washed and dried, and the solvent removed under reduced pressure. The red oil crystallizes on scratching and cooling. The thus-obtained 4-methyl-1-morpholino - 3 - morpholinomethyl - 5 - nitro-isoquinoline of the formula

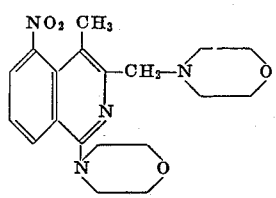

melts after recrystallization from ethanol at 145–146° C.

The starting material is obtained as follows:

To a stirred mixture of 15 ml. concentrated sulfuric acid and 15 ml. fuming nitric acid kept below 0° are added in the course of 30 minutes 6.0 g. of 1-chloro-3-chloromethyl-4-methyl-isoquinoline. Stirring is continued for 1½ hours longer and during this period the temperature is kept below 5° C. The solution is poured into cracked ice and water. The resulting solid is filtered, washed several times with water and the pale yellow solid crystallized from ethanol. The thus-obtained 1-chloro-3-chloromethyl-4-methyl - 5 - nitro - isoquinoline melts at 104–105° C.

EXAMPLE 11

A mixture of 2.5 g. of 1-chloro-3-chloromethyl-4-methyl-5-nitro-isoquinoline and 10 ml. of piperidine is heated under reflux at 80° C. for 2½ hours at the end of which period the excess of piperidine is removed under reduced pressure and the red gum washed with water. Trituration with ethanol gives a solid which is filtered and dried to give orange yellow crystals, being 4-methyl-5-nitro-1-piperidino-3-piperidinomethyl-isoquinoline of the formula

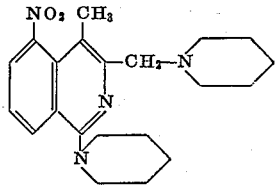

which after recrystallization from ethanol melts at 104–106° C.

EXAMPLE 12

A mixture of 2.5 g. of 1-chloro-3-chloromethyl-4-methylnitro-isoquinoline and 4.55 g. of p-anisidine in 80 ml. of 95% ethanol is heated under reflux for 4 hours, cooled and concentrated to one fourth its volume. Red crystals separate. Further concentration yields more red solid. The combined product is dissolved in chloroform and filtered through a column of alumina. The red eluate on evaporation give a crystalline mass. The thus-obtained 1-p-anisidino-3-p-anisidinomethyl-14-methyl - 5-nitroisoquinoline of the formula

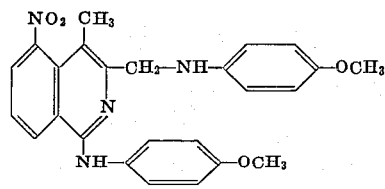

is recrystallized from ethylacetate-hexane and melts at 183–185° C.

EXAMPLE 13

A solution of 4.0 g. of 1-morpholino-3-morpholinomethyl-4-methyl-5-nitro-isoquinoline in 150 ml. of 95% ethanol is hydrogenated in the presence of 0.3 g. 10% palladium on carbon. The reduction is complete in 1 hour and 30 minutes. The catalyst is filtered off and the solvent removed under reduced pressure. The residue is crystallized from ethanol. The thus obtained 5-amino-4-methyl-1-morpholino-3-morpholinomethyl - isoquinoline of the formula

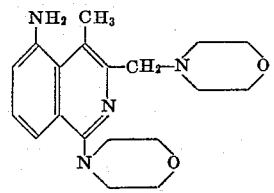

melt at 134–135° C.

EXAMPLE 14

To a solution of 8.0 g. of 5-amino-4-methyl-1-morpholino-3-morpholinomethyl-isoquinoline in a mixture of 6 ml. of concentrated hydrochloric acid and 6 ml. of water cooled to 0° C. is added with stirring a solution of 1.6 g. sodium nitrite in 5 ml. of water. The temperature is maintained 0–5° C. during diazotization. The cold diazonium solution is poured into a cold solution of cuprous chloride prepared from 8.0 g. of copper sulfate. The mixture is allowed to warm up and then heated at 60° C. on a water bath. The solid is filtered, taken up in 25 ml. of water, basified and extracted with chloroform. The extract is washed, dried and stripped of solvent. On trituration with alcohol a pale green solid is obtained. The resulting 5-chloro-4-methyl-1-morpholino-3-morpholinomethyl-isoquinoline of the formula

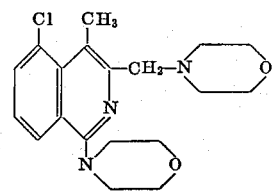

is crystallized from ethanol and then melts at 104° C.

EXAMPLE 15

A mixture of 4.0 g. of 1,7-dichloro-3-chloromethyl-4-methyl-isoquinoline and 50 ml. morpholine is heated under reflux for 4 hours. The residue obtained after removing the excess of morpholine is treated with aqueous sodium carbonate solution until alkaline and extracted with chloroform. The solvent is removed. The residue, representing the 7-chloro-4-methyl-1-morpholino-3-morpholinomethyl-isoquinoline of the formula

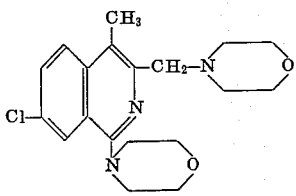

is converted into a maleate by addition of maleic acid in ether. The crystalline maleate is reconverted to the base which after crystallization from ethanol melts at 120°.

The starting material is obtained as follows:

To a stirred mixture of 30.0 ml. of fuming nitric acid and 30 ml. concentrated sulfuric acid kept at −10° is added in small lots 15.0 g. of 4,4-dimethyl-homophthalimide keeping the temperature below 5°. After addition is complete the mixture is stirred below 20° for one hour and the clear yellow solution poured into cracked ice and water. The product is filtered and washed with water and dried to give a white crystalline solid. Recrystallized from ethanol, the 4,4-dimethyl-7-nitro-homophthalimide melts at 209–211°.

A finely powdered suspension of 23.4 g. of 4,4-dimethyl-7-nitro-homophthalimide in 200 ml. methanol is hydrogenated in the presence of 0.5 g. 10% palladium-carbon at an initial pressure of 50 lbs./sq. in. and 50°. The theoretical amount of hydrogen is absorbed in 1½ hours. The catalyst is filtered off and the clear solution evaporated to dryness under reduced pressure. The residue is crystallized from methanol. The thus obtained 4,4-dimethyl-7-amino-homophthalimide melts at 176–179°.

20 g. of 7-amino-4,4-dimethyl-homophthalimide are suspended in 90 ml. water. 26 g. of concentrated sulfuric acid are added gradually with stirring to dissolve the amine. The solution is cooled to 0° C. and a solution of 8.4 g. of sodium nitrite in 24 ml. of water added at such a rate that the temperature is kept below 5° C. To a cold cuprous chloride solution maintained at 10° C. prepared from 33.4 g. of copper sulfate is added the diazonium solution drop by drop with stirring. The mixture is allowed to warm up to room temperature after the addition is complete and then heated at 60° C. for 30 minutes. Dilution with water and extraction with chloroform gives a crystalline material. Recrystallized from dilute-ethanol the 4,4-dimethyl-7-chloro-homophthalimide melts at 200° C.

A mixture of 10.0 g. of 4,4-dimethyl-7-chloro-homophthalimide and 40 ml. phosphorus oxychloride and 0.5 ml. water is heated in a sealed tube at 200° C. for 5 hours. The excess of phosphorus oxychloride is removed under reduced pressure, the residue dissolved in 30 ml. chloroform and passed through a column of neutral alumina. Elution with chloroform gives 1,7-dichloro-3-chloromethyl-4-methyl-isoquinoline which after recrystallization from chloroform-hexane melts at 135° C.

EXAMPLE 16

A mixture of 5.0 g. of 1-chloro-3-chloromethyl-4-methyl-5-nitro-isoquinoline and 8 ml. piperidine in 75 ml. ethanol is heated under reflux for 1 hour. The crystals which separate on cooling are filtered, dried and recrystallized from ethanol. The thus-obtained 1-chloro-4-methyl-5-nitro-3-piperidinomethyl-isoquinoline of the formula

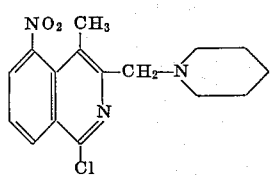

melts at 67–69° C.

EXAMPLE 17

A mixture of 4.5 g. of 1-chloro-3-chloromethyl-4-methyl-isoquinoline and 15 ml. piperidine is heated in an oil bath at 80° C. for 2 hours under reflux, cooled and 100 g. of cracked ice and water added. The resulting solid is filtered, washed with water and dried. Recrystallization from ethanol-water yields the 1-chloro-4-methyl-3-piperidinomethyl-isoquinoline of the formula

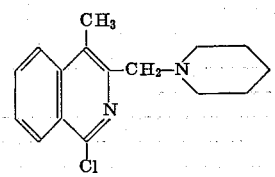

M.P. 79–80° C.

EXAMPLE 18

A mixture of 3.5 g. of 1-chloro-3-chloromethyl-4-methyl-5-nitro-isoquinoline and 2.58 g. of N-methyl-piperazine in 100 ml. ethanol is heated under reflux for 2 hours and the volume reduced to one half. The crystals which separate are filtered, washed with water and recrystallized from ethanol. The thus-obtained 1-chloro-3-(N′-methyl - piperazino - methyl) - 4 - methyl-5-nitro-isoquinoline of the formula

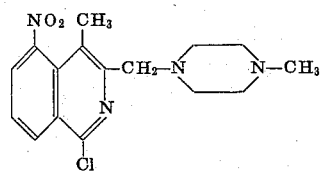

melts at 173–175° C.

EXAMPLE 19

A mixture of 4.0 g. of 1-chloro-3-chloromethyl-4-methyl-5-nitro-isoquinoline and 10 ml. of N-carbethoxy-piperazine in 75 ml. ethanol is heated under reflux for 1 hour and the resultant clear solution cooled. The product which separates is filtered, dried and recrystallized from ethanol. The thus-obtained 1-chloro-3-(N′-carbethoxy-piperazino-methyl)-4-methyl-5-nitro-isoquinoline of the formula

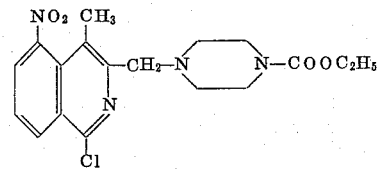

melts at 127–128° C.

EXAMPLE 20

A solution-emulsion of 4.5 g. diethanolamine in dioxane is added with swirling to a solution of 2.71 g. 1-chloro-3-chloromethyl-4-methyl-5-nitro-isoquinoline in 50 ml. of dioxane. The mixture is heated under reflux for 3 hours and cooled. Removal of dioxane in vacuo yields a residue which is triturated with 10% sodium carbonate solution and left at room temperature for about an hour when it solidifies. It is filtered, washed thoroughly with water and air-dried. The thus-obtained 1-chloro-3-[di(β-hydroxyethyl)-amino-methyl]-4-methyl-5-nitro-isoquinoline of the formula

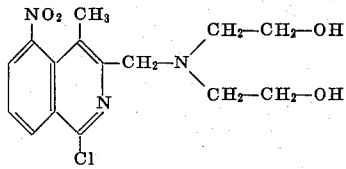

is recrystallized from ethylacetate-hexane and then melts at 110–112° C.

EXAMPLE 21

Pharmaceutical preparations can be formulated as follows:

The 7-chloro-1-morpholino-3-(morpholinomethyl)-4-methyl-isoquinoline can be made up, e.g. into pharmaceutical preparations of the following composition:

(a) Tablets

| | Mg. |
|---|---|
| 7-chloro-1-morpholino-3-(morpholinomethyl)-4-methyl-isoquinoline-maleate | 20.0 |
| Lactose | 33.5 |
| Wheat starch | 20.0 |
| Gelatine | 1.0 |
| Arrowroot | 10.0 |
| Talcum | 5.0 |
| Magnesium stearate | 0.5 |
| | 90.0 |

(b) Ampoules

| | Mg. |
|---|---|
| 7-chloro-1-morpholino-3-(morpholinomethyl)-4-methyl-isoquinoline-maleate | 10.0 |
| Mannite | 90.0 |
| Distilled water to make up 2 ml. | |

The ampoules are sterilized for 20 minutes at 120° C.

EXAMPLE 22

A mixture of 5.0 g. of 1-chloro-3-chloromethyl-4-methyl-isoquinoline and 5.5 ml. of 4-methylpiperidine is heated at 80° C. for 2 hours at the end of which period the resulting oil is cooled and diluted with cracked ice and water. The solid which separates is filtered, washed with water, dried and crystallized from aqueous ethanol. The thus-obtained 1-chloro-3-(4-methyl-piperidino-methyl)-4-methyl-isoquinoline of the formula

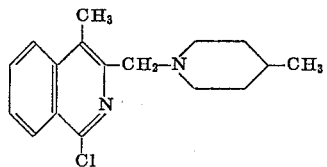

melts at 83–85° C.

EXAMPLE 23

A mixture of 5.0 g. of 1-chloro-3-chloromethyl-4-methyl-isoquinoline, 80 ml. of concentrated ammonium hydroxide (28%) and 1.0 g. hydrated copper sulfate is heated at 140° C. in a sealed tube for 30 hours. The volatile material is evaporated off and the dark residue washed with water, extracted with chloroform and the extract washed, dried and stripped of solvent. The residual solid is crystallized from dimethyl formamide-water to give pale tan crystals. The thus-obtained di-[1-chloro-4-methyl-isoquinolyl-(3)-methyl]-amine of the formula

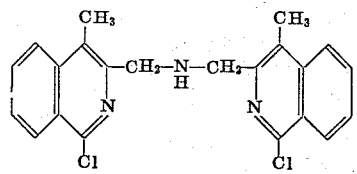

melts at 131–132° C.

EXAMPLE 24

A mixture of 5.0 g. of 1-chloro-3-chloromethyl-4-methyl-isoquinoline and 6.5 g. of N-(γ-amino-propyl)-morpholine is heated at 100° C. for 2½ hours, cooled and the resulting thick oil triturated with cracked ice and water. The white gummy solid is extracted out with chloroform, extract washed, dried and stripped of solvent. The residue is taken in 20 ml. ethanol, water added to turbidity and cooled. The crystalline product is collected by filtration and dried. The thus-obtained N,N-di-[1-chloro-4-methyl-isoquinolyl-(3)-methyl]-N-γ-morpholino-propyl-amine of the formula

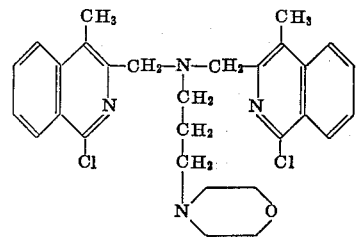

melts at 110–112° C.

EXAMPLE 25

A mixture of 1.55 g. of 1-chloro-3-chloromethyl-4-methyl-isoquinoline and 5 ml. of morpholine is heated in a bomb tube overnight at 150° C. The resulting crystalline suspension is allowed to cool and then evaporated to dryness. The crystalline residue is distributed in 2 stages between chloroform and dilute aqueous hydrochloric acid. The combined aqueous layers are then adjusted to pH 8 to 9 with sodium hydroxide solution. The precipitating oil crystallizes gradually and is suctioned off after a few hours at 0° C. Recrystallization from 10 cc. of isopropanol yields 1-morpholino-3-(morpholino-methyl)-4-methyl-isoquinoline of the formula

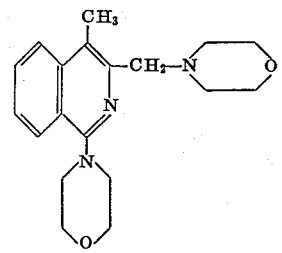

in the form of colorless crystals melting at 100° C.

When this substance is dissolved in excess methanolic hydrochloric acid and the solution is evaporated, there is obtained the corresponding dihydrochloride which melts at 229–232° C. with decomposition after having been recrystallized from alcohol+ether 1:1. In a similar manner the maleate is obtained which melts at 173–175° C.

What is claimed is:

1. A compound of the formula

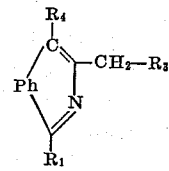

in which pH represents a member selected from the group consisting of phenylene-(1,2) and phenylene-(1,2) substituted by a member selected from the group consisting of halogen, trifluoromethyl, lower alkyl, lower alkoxy, lower alkylmercapto, lower alkylenedioxy, nitro and amino, $R_4$ represents a lower alkyl radical and $R_1$ and $R_3$ each represents a member selected from the group consisting of di-lower alkylamino, pyrrolidino, piperidino, piperazino, N-methyl-piperazino, N-ethylpiperazino, N-β-hydroxy-ethylpiperazino and morpholino.

2. A therapeutically useful acid addition salt of a compound of claim 1.

3. A compound of the formula

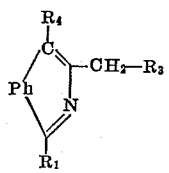

in which Ph represents a member selected from the group consisting of phenylene-(1,2) and halogenphenylene-(1,2) radical, $R_4$ represents methyl and $R_1$ and $R_3$ each represents a member selected from the group consisting of di-lower alkylamino, pyrrolidino, piperidino, piperazino, N-methyl-piperazino, N-ethyl-piperazino, N-β-hydroxyethylpiperazino and morpholino.

4. A therapeutically useful acid addition salt of a compound of claim 3.

5. A member selected from the group consisting of 4-methyl - 1-morpholino-3-morpholino-methyl-7-chloro-isoquinoline and a therapeutically useful acid addition salt thereof.

6. A member selected from the group consisting of 4-methyl - 1 - morpholino-3-(2-methyl-piperidino-methyl)-isoquinoline and a therapeutically useful acid addition salt thereof.

7. 4 - methyl - 1-morpholino-3-morpholino-methyl-isoquinoline.

8. 4 - methyl - 1-morpholino-3-morpholino-methyl-isoquinoline-dihydrochloride.

9. 4 - methyl - 1-morpholino-3-morpholino-methyl-isoquinoline-maleate.

10. A compound of the formula

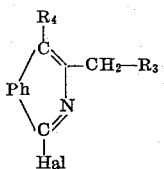

in which Hal represents a halogen atom, Ph represents a member selected from the group consisting of phenylene-(1,2) and phenylene-(1,2) substituted by a member selected from the group consisting of halogen, trifluoromethyl, lower alkyl, lower alkoxy, lower alkylmercapto, lower alkylenedioxy, nitro and amino, $R_4$ represents a lower alkyl radical and $R_3$ represents a member selected from the group consisting of di-lower alkylamino, pyrrolidino, piperidino, piperazino, N-methyl-piperazino, N-ethyl-piperazino, N-β-hydroxyethylpiperazino and morpholino.

11. A therapeutically useful acid addition salt of a compound of claim 10.

12. A compound of the formula

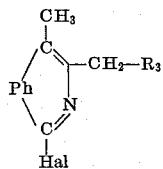

in which Hal represents a halogen atom, $R_3$ represents a member selected from the group consisting of di-lower alkylamino, pyrrolidino, piperidino, piperazino, N-methyl-piperazino, N-ethyl-piperazino, N-β-hydroxy-ethylpiperazino and morpholino and Ph represents a member selected from the group consisting of halogen-phenylene-(1,2), nitro-phenylene-(1,2), and phenylene-(1,2).

13. A therapeutically useful acid addition salt of a compound of claim 12.

No references cited.

ALEX MAZEL, *Primary Examiner.*

HENRY R. JILES, RICHARD J. GALLAGHER,
*Assistant Examiners.*